United States Patent [19]

Fasig

[11] 4,384,202
[45] May 17, 1983

[54] TRACK CONTROLLER FOR A DOCUMENT PROCESSOR

[75] Inventor: Harold A. Fasig, Plymouth, Mich.

[73] Assignee: Burroughs Corporation, Detroit, Mich.

[21] Appl. No.: 215,266

[22] Filed: Dec. 11, 1980

[51] Int. Cl.³ .............................................. G01V 9/04
[52] U.S. Cl. ................................ 250/223 R; 340/674
[58] Field of Search .................. 250/223 R, 208, 209; 340/674

[56] References Cited

U.S. PATENT DOCUMENTS

4,231,567 11/1980 Ziehm ................................. 340/674
4,268,746 5/1981 Schroeder ....................... 250/223 R
4,275,293 6/1981 Chambors ...................... 250/223 R Primary Examiner—David C. Nelms
Attorney, Agent, or Firm—Delbert P. Warner; Kevin R. Peterson

[57] ABSTRACT

A controller monitors and controls the operation of the document transporting portions of a document processor. It employs sensors which detect the passage of the trailing edges of documents and timers which measure the time taken for a document to pass successive sensors. Whenever this time period is too long, the controller determines that the document being timed has jammed and provides signals to stop the operation of sections of the system in an orderly fashion designed to minimize the effects of jamming.

12 Claims, 10 Drawing Figures

FEEDER-READER TRANSPORT

TRACK CONTROLLER FOR A DOCUMENT PROCESSOR

BACKGROUND OF THE INVENTION

1. Field of the Invention

The present invention relates to document processing machines and particularly to a controller for monitoring and controlling the operation of the track portion of a document handling machine, where the track portion lies between the feeder portion, which receives documents, and the sorter portion, which dispenses documents in ordered groups. It relates more particularly to the detection of conditions incipient to jamming in the track and to steps to minimize the effects of jamming including stopping the delivery of documents from the feeder portion, stopping portions of the track which are directly involved in the jamming area, and stopping the remaining portions of the system after first allowing clearance of documents from all portions not directly involved in the jamming.

2. Description of the Prior Art

Exemplary prior art for preventing jamming in document processing equipment is disclosed in U.S. Pat. No. 4,151,410 to Andrew H. McMillan and William B. Templeton, entitled "Document Processing, Jam Detecting Apparatus and Process" which issued Apr. 24, 1979. Apparatus according to that patent employs sensors spaced along document transport tracks to monitor the passage of the documents. Typically, the sensors are used to detect the translucency of each document. Translucency is variable through a document in motion because of irregularities in the paper. If no changes in translucency are perceived for a time while the equipment is running, it is understood that the document has stopped moving and the equipment has probably jammed. While that patent is believed to concern relevant prior art, the present invention, as claimed, is clearly patentable thereover.

Another example of relevant prior art is to be found in a copending U.S. Pat. application Ser. No. 108,797 filed Dec. 31, 1979 in the name of John M. Chambors and entitled "Jam Detection and Recovery Systems". Now U.S. Pat. No. 4,275,293. That application relates to document sorting systems and particularly relates to apparatus for detecting jamming of documents in document sorting tracks and to the prevention of further jamming. The system involves detecting conditions attendent to jamming in document handling tracks and taking immediate action to prevent the introduction of new documents into a track while clearing the track by routing documents to their proper pocket destinations or to a missort pocket.

Prior art devices such as those outlined above have functioned well in earlier models of document processing equipment, but have not been found to be satisfactory in present machines which operate at higher speeds. In addition, when a jam condition starts to develope, a need exists with present apparatus to clear the machine at a higher speed than formerly, which includes stopping the machine feeder to prevent the entry of further documents into the track and then clearing the track. Clearing the track, as conceived for the present apparatus, involves completing the clearance of documents from the track upstream and downstream of the point at which the jam occurs while providing signals to the sorter portion to enable the latter to continue operating until documents have been cleared from the sorter. These more stringent requirements have led to a search for better means and to the development of the present invention.

SUMMARY OF THE INVENTION

The invention relates to a controller for a track system for transmitting documents between a feeder, which provides the documents in a well ordered sequence, and a stacker, which sorts individual documents into pockets.

The controller employs sensors which detect the passage of documents. By monitoring the timing of the passage of the documents, the controller is able to detect conditions leading to the jamming of documents in each section of track. It then provides signals to stop the flow of documents in the portion of the track in which the jamming occurs, in the portion of the track upstream of where the jamming occurs and in the feeder. The controller enables documents which are downstream of the jammed area to be passed along in an orderly fashion to the stacker while it turns off successive stages of the machine after each stage is cleared of documents.

DESCRIPTION OF A PREFERRED EMBODIMENT OF THE INVENTION

Figures 1, 1A:
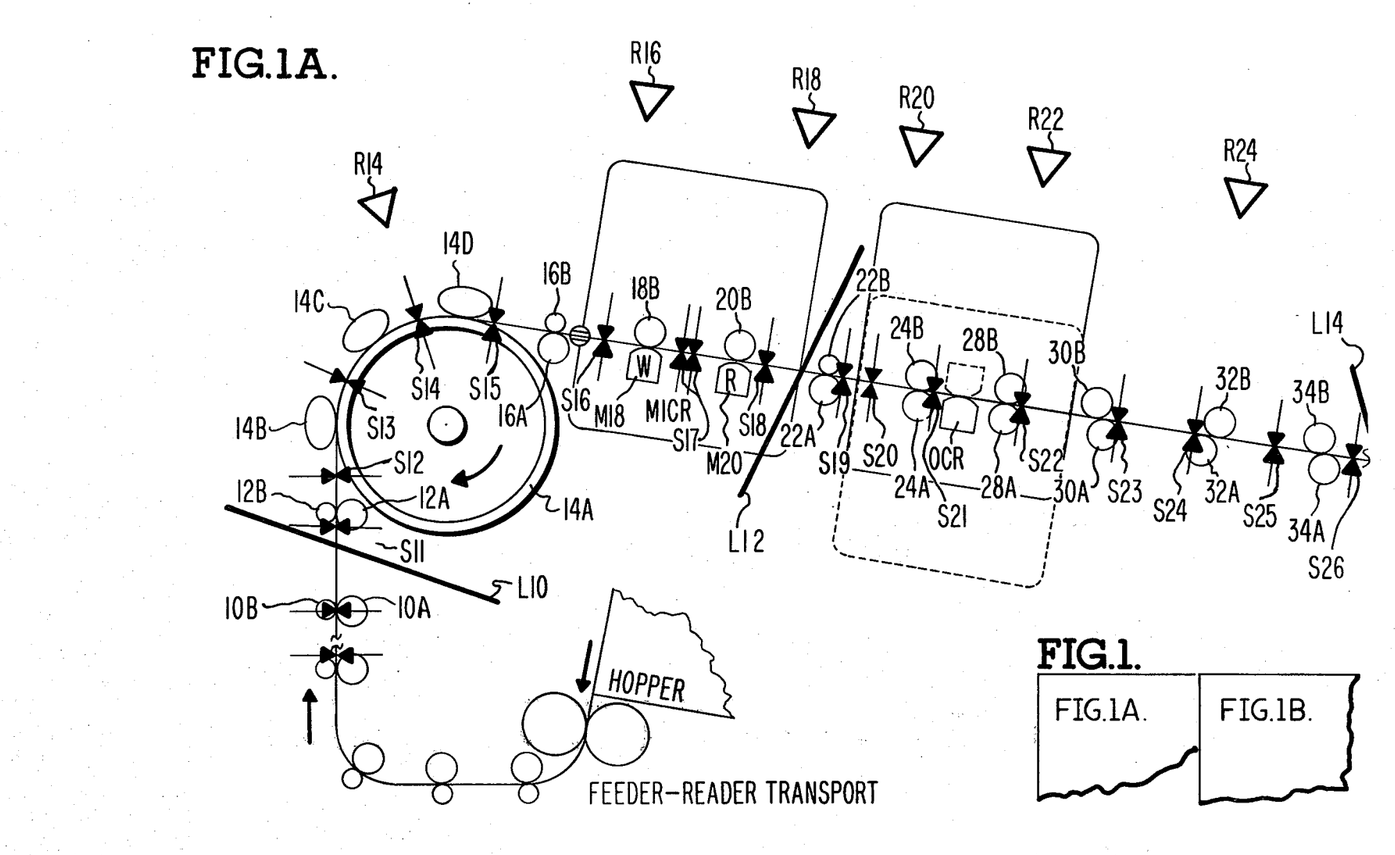
FIGS. 1, 1A, 1B are schematic diagrams showing a portion of the track of a document processing machine.
Figure 1B:
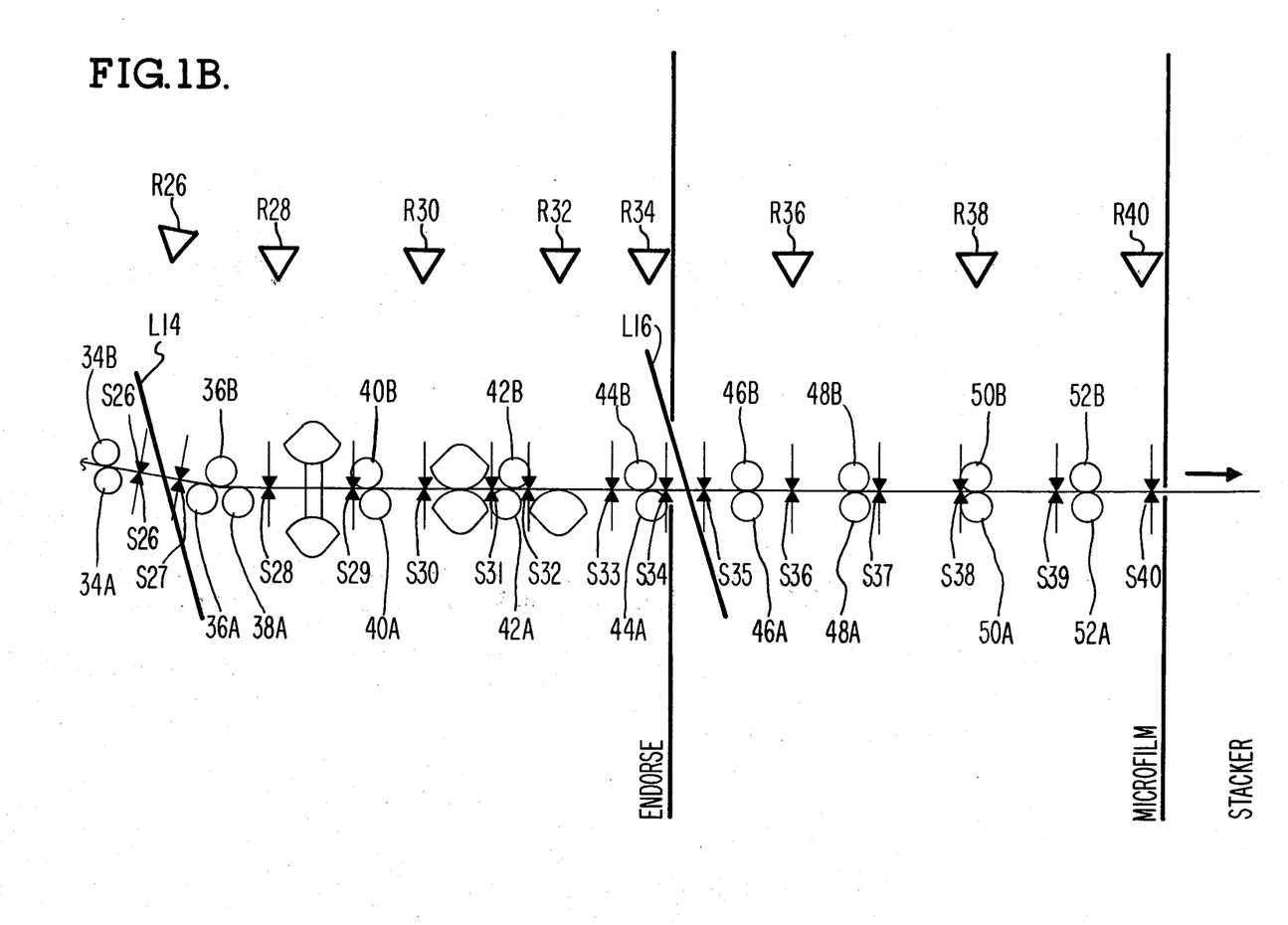

Turning first to FIGS. 1A, 1B, a plan view is shown of the track portion of a document processor in accordance with the invention.

A document feeder supplies documents from a pair of rollers 10A, 10B, which are the last rollers in the feeder, to the first pair of rollers 12A, 12B in the track. In each of these numerical designations, the suffix A designates a driver roller and B designates a driven, or idler roller. An example of a document feeder of use in the practice of this invention is shown in the copending U.S. patent application entitled "Controller for a Servo Driven Document Feeder" which was filled on June 30, 1980 as application Ser. No. 164,004, in the name of Harold A. Fasig and assigned to the same assignee as the present invention. This copending application now U.S. Pat. No. 4,331,328 which issued on May 25, 1982, is hereby incorporated by reference.

As explained in the referenced copending application, documents will be supplied from rollers 10A, 10B, in the feeder to rollers 12A, 12B in the track at a preselected speed corresponding to the operating speed of the track portion of the processor. In a preferred example this speed will cause the documents to travel at 100 inches per second. Spacing between successive documents received from the feeder will be at substantially a constant value, as is also explained in the copending application.

Documents will be transported at the constant speed and with constant spacing between them through action of the combination drive and driven, or idle, rollers 12A, 12B, 14A, 14B . . . 52A, 52B which are driven by constant speed motors (not shown). The ends of the rollers in FIG. 1 are shown from a perspective in which most of them appear to be round, but idle rollers 14B, 14C and 14D are positioned to rotate against the drum 14A at such an angle that their end sections appear to be eliptical.

A plurality of sensors paired with light sources and numbered consecutively from S11 through S40 are indicated in FIG. 1. Each of these may be a phototransistor or a photodiode coupled with a light source, such as an IRLED. When the track is clear or free of documents, light from the IRLEDs is transmitted across the track to the phototransistors. When no signal is received by a phototransistor, the system interprets the absence to mean that an opaque document is positioned in the track between the IRLED and the phototransistor.

A plurality of triangles labeled R14, R16 . . . R40 are shown above the path of the tack in FIG. 1. These triangles represent ID registers, or identification registers which, in cooperation with corresponding even-numbered sensors S14, S16 . . . S40, identify each document by number as its leading edge passes the corresponding sensor. The assignment of numbers is made initially by a counter (part of block 72 in FIG. 2) in response to signals from sensor S12 as the leading edge of each document passes. The number identifying a passing document is moved along to successive ID registers as the leading edge of each document is perceived to move along the track. In FIG. 1, the registers are indicated by triangles along the track in the form of discrete hardware for the sake of simplicity, the connectors between sensors and registers and between registers have been omitted since their existence is evident from basic consideration.

The system is divided into "sections" or parts which are controlled as distinct units. These sections are bounded by lines L10, L12, L14 and L16 in FIGS. 1A, 1B. The section below L10 denotes the feeder, the section between L10 and L12 includes a first reader with MICR components at M18, M20; the section bounded by L12 and L14 denotes a second reader employing OCR components; the section between L14 and L16 includes the endorser and the section beyond L16 is a microfilm section (optional) which feeds into the stacker.

Figure 2:
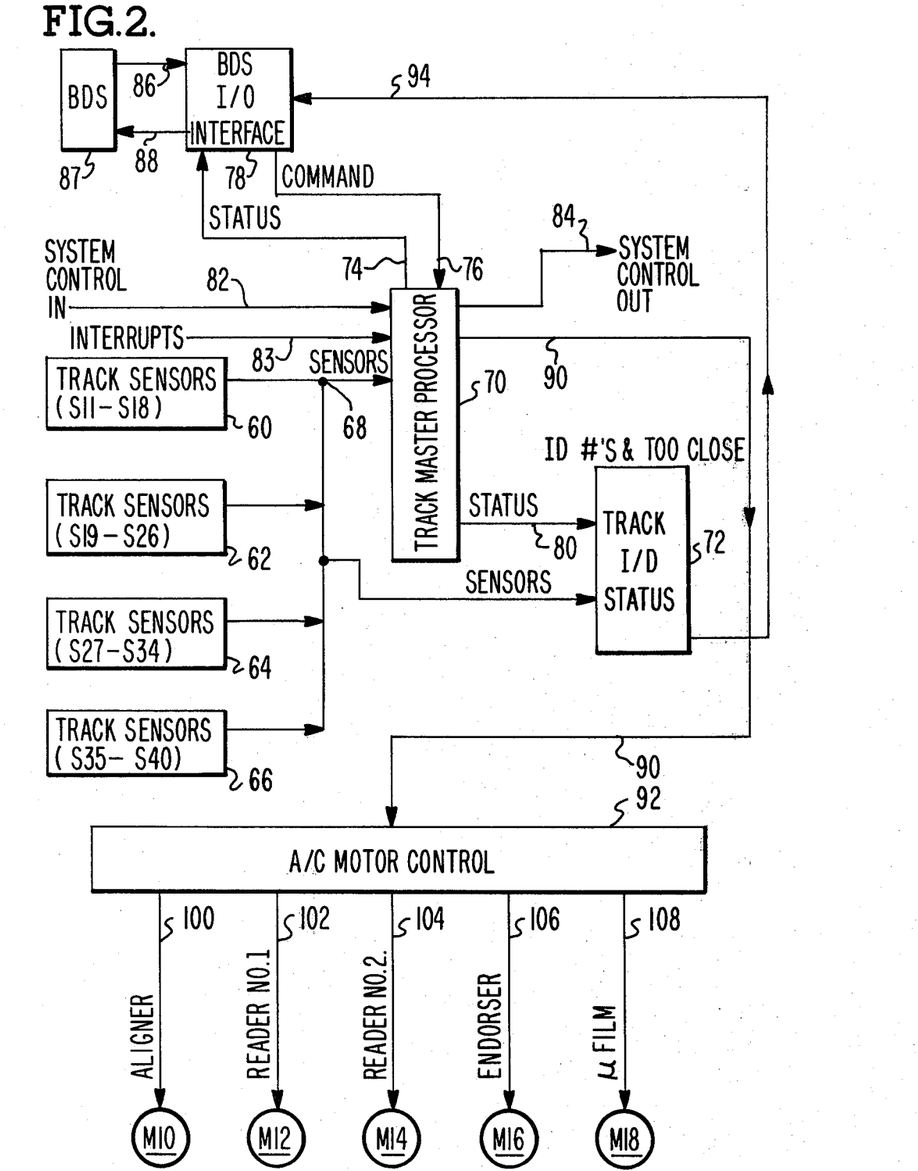
FIG. 2 is a block diagram presenting an overview of controls for the track of a document processing machine according to the invention.

A block diagram in FIG. 2 illustrates an overall track control system. The sensors are indicated in FIG. 2 in groups of eight in blocks 60, 62, 64 and 66, where the blocks represent assemblies on printed circuit boards or the like. The outputs of the sensors are supplied over a bus 68 as inputs to a track master processor indicated by a block 70 corresponding in a preferred example to the assembly on a PC board of a microprocessor, such as an Intel 8035, associated memories and other components. The outputs of the sensors are supplied also to a track identification and status apparatus indicated by a block at 72.

The track master processor at 70 interconnects via lines 74 and 76 to a BDS input/output interface indicated by block 78. The I/O interface is coupled via lines 86 and 88 to a central processor indicated in block 87 as BDS for Burroughs Data System. Other Interconnections from the track master processor at 70 are indicated by a plurality of lines including a status line 80 to the track identification and status block 72, by system input and output lines 82, 83 and 84, and by motor control lines at 90 to motor control block 92. Track ID and status data are coupled from block 72 via line 94 to the BDS Input/Output block 78.

The AC/DC motor controls at 92 supply control signals over interconnection lines 100, 102, 104, 106 and 108 to respective motors M10, M12, M14, M16 and M18 for control respectively of sections of the track, such as the aligner, reader No. 1, reader No. 2, endorser and microfilm.

Figure 3:
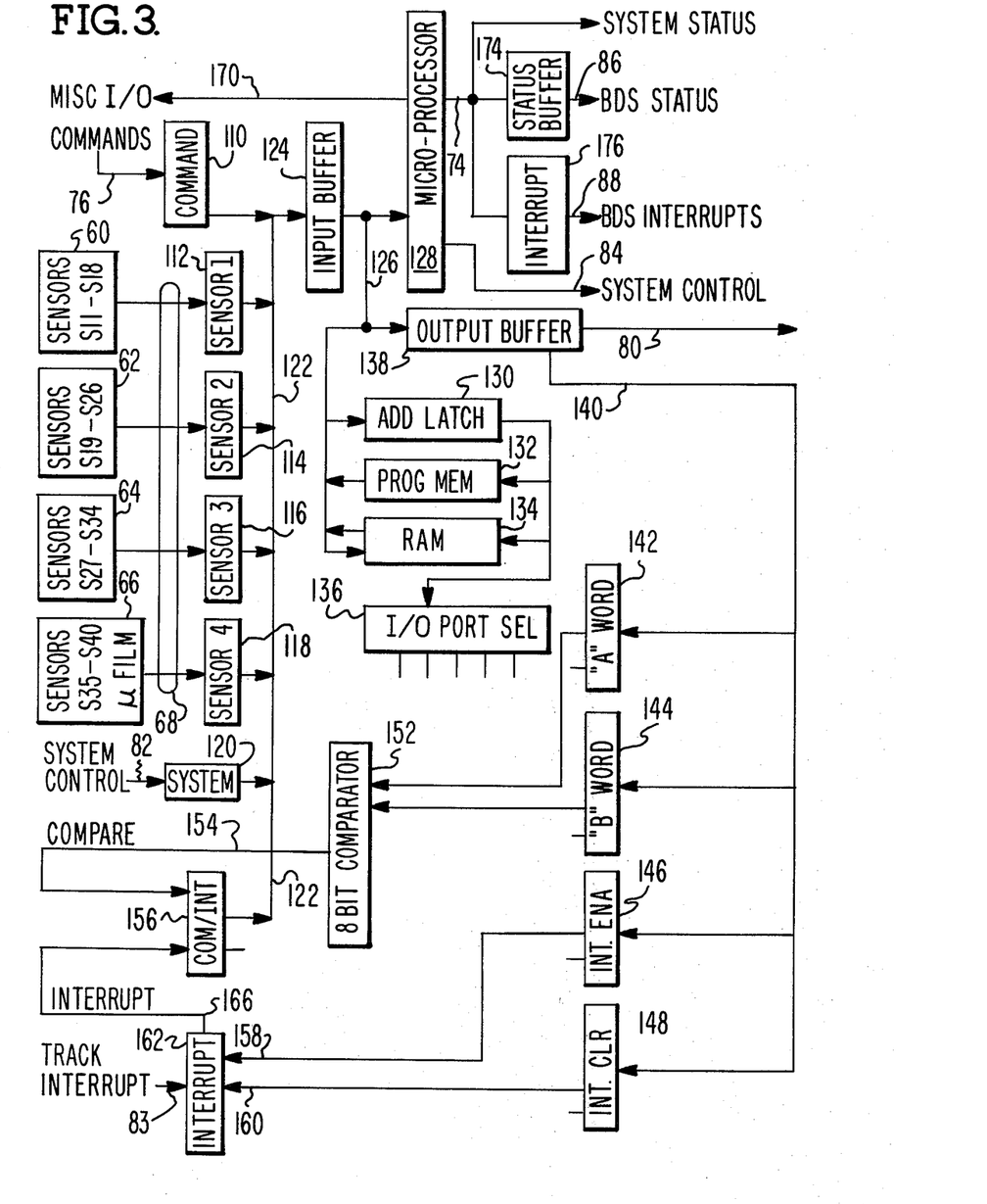
FIG. 3 is a block diagram depicting details of the track master processor of FIG. 2.

FIG. 3 is a block diagram showing details of the track master processor 70 of FIG. 2 together with interconnections. In this figure, various inputs in the form of commands and signals to a microprocessor at 128 are supplied through units 110, 112, 114, 116, 118 and 120 via a bus 122, an input buffer 124 and a bus 126. Various memory and control functions are provided over bus 126 to and from elements indicated by blocks 130, 132, 134 and 136 where 130 is an address latch, 132 is a ROM program memory, 134 is a RAM or random access memory and 136 represents an input/output port selector. The microprocessor 128 will preferably be an 8035 served by the external memories referred to above.

Signals over bus 126 may be applied through an output buffer at 138 and over a bus 140 to a plurality of processing apparatuses indicated by blocks 142, 144, 146, and 148. Memories 142 and 144 accept an "A" word and a "B" word, respectively, to be compared in an 8 bit comparator at 152.

The A word and B word are used to determine in which sections of the track the jam occurs. In response to these signals, the track can then be shut down in an orderly manner. The A word represents the highest sensor number in a section of track. The B word is the address of the soft timer which indicates the jam. When B is greater than A it is known that the jam is downstream from the section which is currently being addressed and the comparison is made with successively larger words B until the section of track in which the jam has occured is located. That section is then shut down by signals from the processor and the other sections are shut down also in an orderly fashion after they have been cleared to the extent possible.

The output of comparator 152 is applied over 154 to the comparator/interrupter 156. Interrupter ENA at 146 and interrupter CLR at 148 accept signals from bus 140 to be applied over lines 158 and 160 to the interrupt switch 162 which also accepts interrupt signals over line 83 from other sections of the machine. The output of 162 is applied over line 166 to comparator/interrupter 156 from which signals are supplied over bus 122 to input buffer 124. By way of example, if the stacker is jammed, stacker interrupt signals from 83 through 162 and 166 to 156 and then over bus 122 will be used to cause the track to close down immediately. Status and ID signals are supplied through the Status and ID switch 72 to line 94, as shown in FIG. 2.

Line 170 is connected to the microprocessor 128 for the transfer of miscellaneous input and output information. Line 74 is connected from 128 to accept data which may be transmitted directly over the line to supply information respecting system status. Information respecting BDS status and BDS interrupts is supplied over 74 via a status buffer 174 and an interrupt signal buffer 176, respectively. Data respecting system control is supplied over 84.

Figure 4:
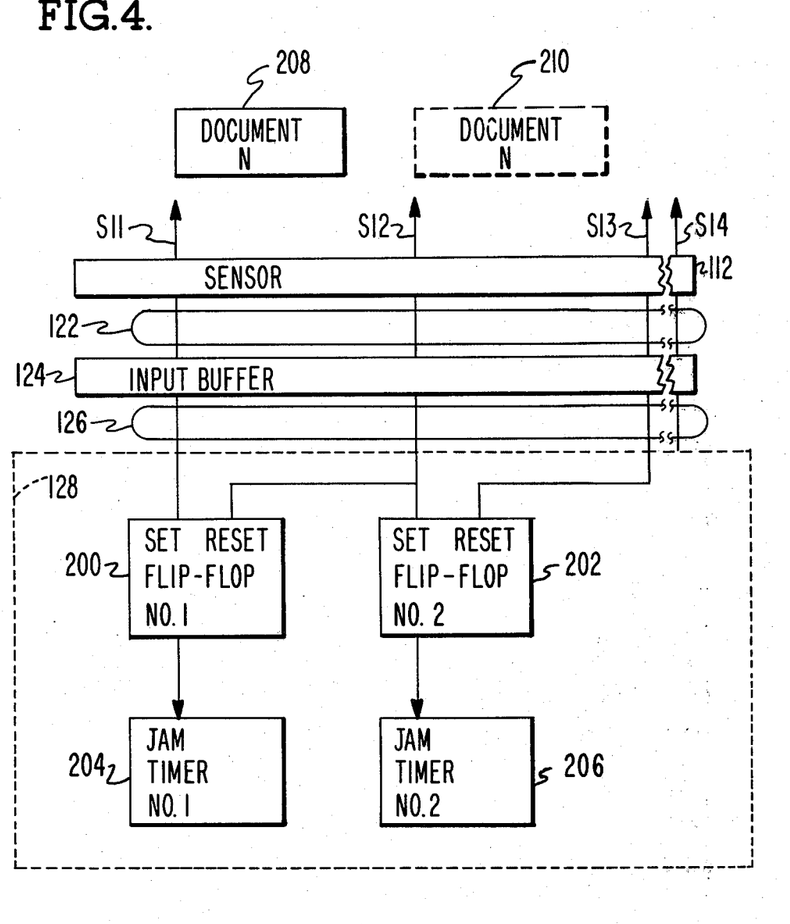
FIG. 4 is a block diagram showing relationships between sensors, memory register flip-flops and memory register timers used to generate signals which indicate when a jamming condition developes in the track associated with a track controller.

FIG. 4 represents relationships between sensors such as S11, S12, S13, memory register (or soft) flip-flops represented by blocks 200 and 202, and memory register (or soft) jam timers represented by blocks 204 and 206. In practice, as the trailing edge of a document N, at 208, passes a sensor S11 a soft flip-flop represented by the block 200 is set. The flip-flop in turn activates a soft timer represented by the block at 204.

If the document N moves within a prescribed time period to the position indicated by the block formed of dashed lines, at 210, in FIG. 4, the sensor S12 detects the trailing edge and provides a suitable signal to the processor which in turn resets the flip-flop No. 1 at 200. Resetting soft flip-flop No. 1 in turn will cause the processor to reset the soft timer 204.

In the event the document N does not reach the point indicated by the dashed lines within a prescribed period, flip-flop No. 1 will not be reset which will allow the soft timer to expire indicating that a jam condition has developed. In response, the microprocessor will then provide the necessary signals to progressively close down the system.

When a jam condition develops and the system closes down, the information held by the ID registers R14, R16 . . . R40 is employed by the microprocessor to identify the positions of each of the documents which was being processed. This information is provided on visual displays (not shown) upon request of the operator, enabling the operator to decide what steps are needed to complete the clearance of the machine and prepare it for restarting.

Figures 5, 5A:
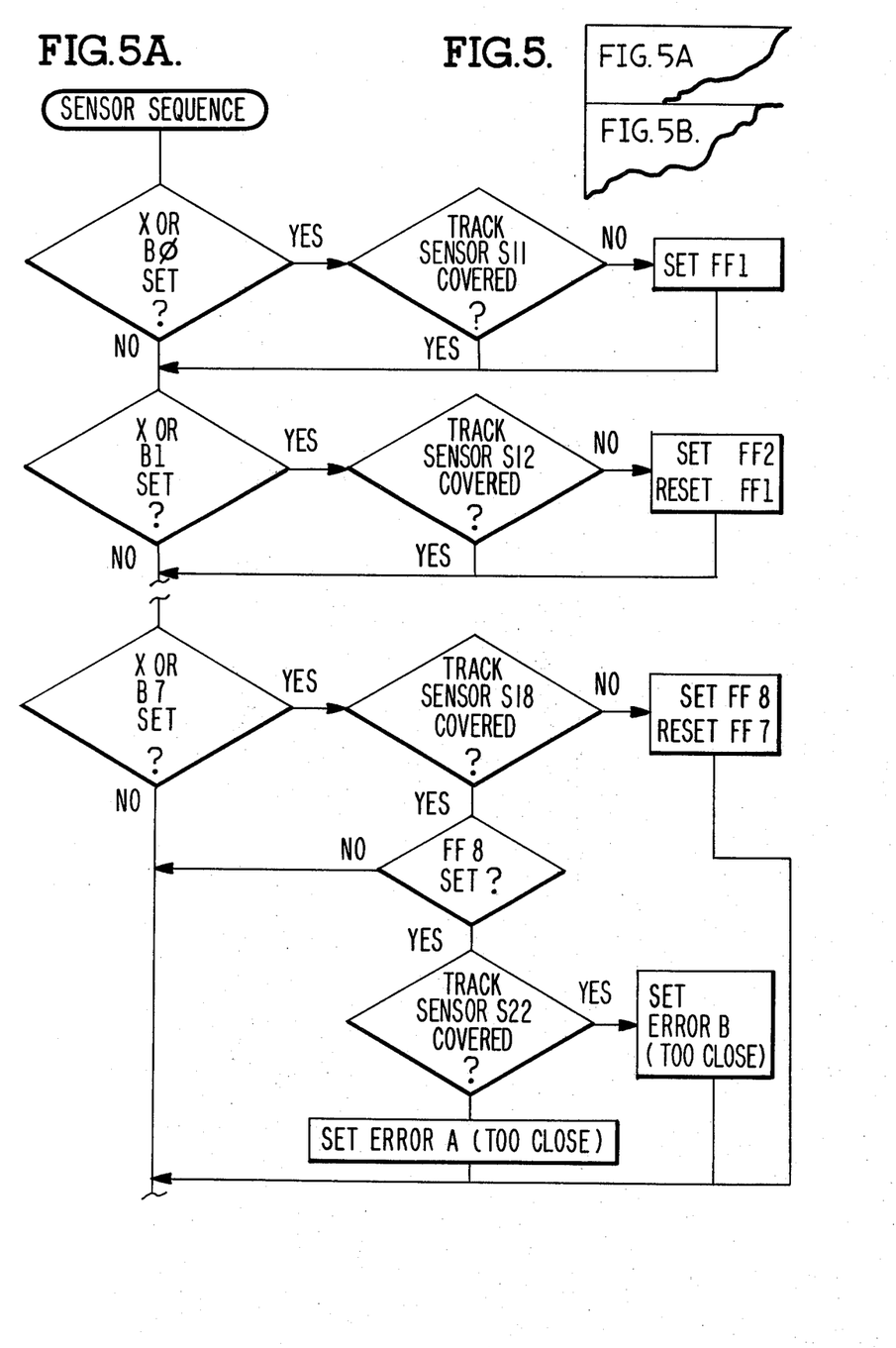
FIGS. 5, 5A, 5B and 6 depict flow charts of use in the understanding of the invention.
Figure 5B:
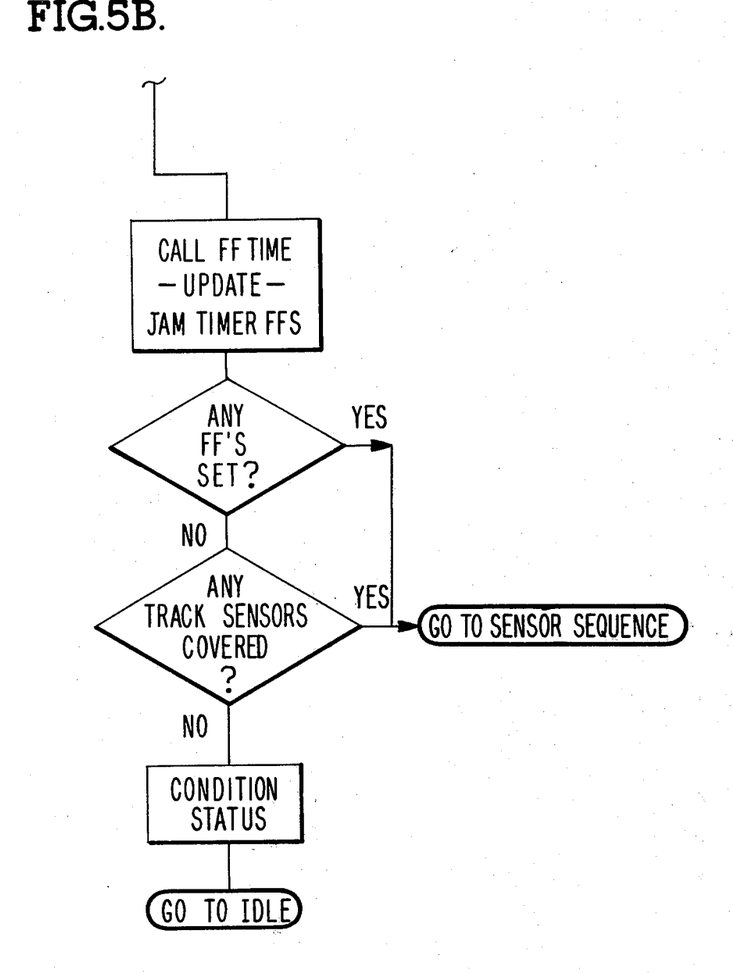
Figure 6:
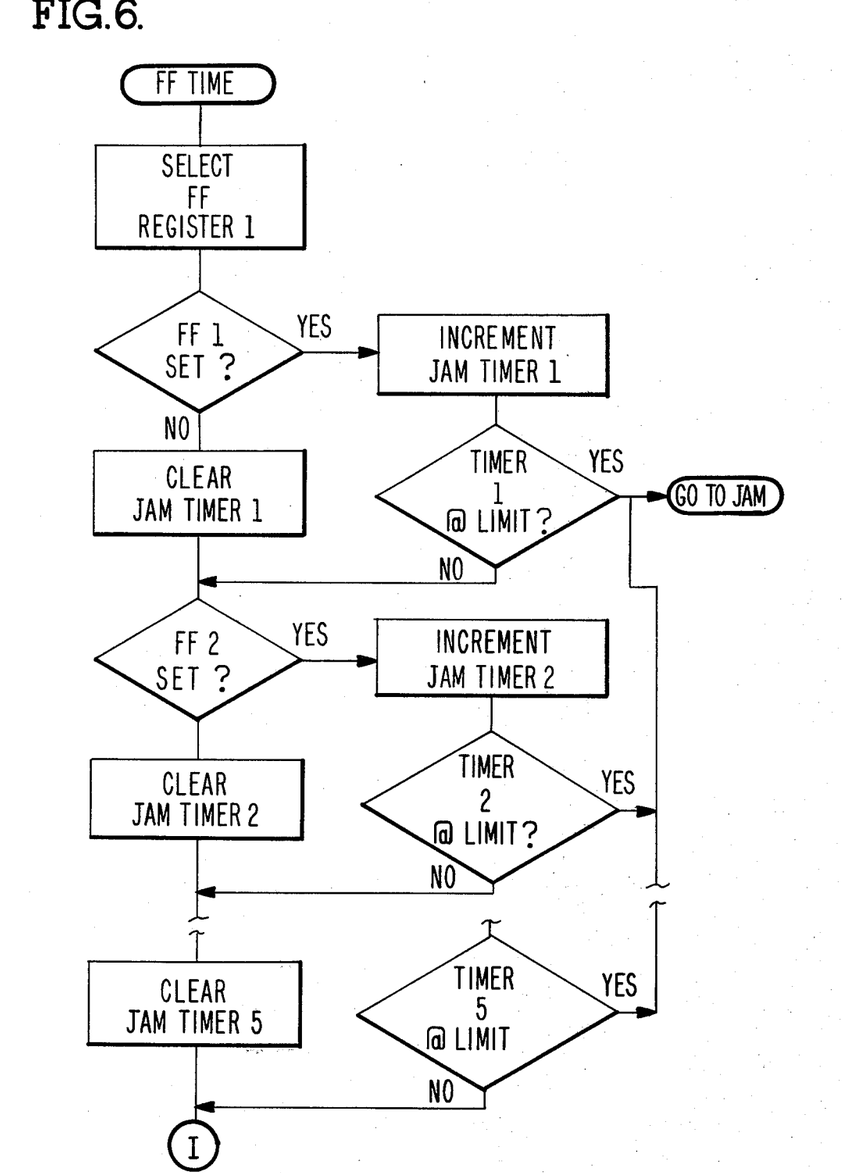

Attention is directed to the flow charts in FIGS. 5A, 5B and 6 for a further explanation of the operation of the soft flip-flops and the soft jam timers. As indicated in FIG. 5A, 5B, after a change has occurred in successive sensors as measured by the exclusive OR procedure, the respective soft flip-flops are set and reset sequentially as the sensors continue to indicate the documents have passed. FIG. 5 includes a sequence of steps following the exclusive OR B7 set which is used to determine whether documents are too close together. The flow chart in FIG. 6 shows the relationships between the condition of the flip-flops and the jam timers and the manner in which the development of a jam condition is determined by the timers.

What is claimed is:

1. In a track controller for a document processor, means comprising:
   a plurality of sensors spaced in succession along a document track to detect the passage of the trailing edges of documents moving along the track and to provide signals denoting said passage;
   means, including timer means, responsive to said signals for locating and indicating jam conditions in the document track, where the existence of jam conditions is determined by measuring the time lapse between the passage of the trailing edge of each document past a succession of sensors and determining when any time period exceeds a prescribed value;
   means identifying each sensor by number and providing a plurality of first words, each of which identifies the highest sensor number in a section of track;
   means for identifying the address of timer means indicating jam conditions and providing a second word indicating said address;
   means for comparing the second word successively with each of the first words until a match is made, thereby identifying a section of track in which the jam condition is located; and
   means for providing signals to stop the section of track in which the jam condition is located, clear the other sections of track and close the track down in an orderly fashion.

2. The invention as claimed in claim 1, in which:
   the means responsive to said signals includes flip-flop means which are coupled to be "set" when the trailing edge of a document passes a first sensor, thereby providing a first output, and "reset" when the trailing edge of the same document passes a second sensor, thereby providing a second output.

3. The invention as claimed in claim 1, in which
   the means for providing signals to stop the track in the section of track in which the jam condition is located includes means for providing signals for sequentially closing down each other section of the track after first attempting to clear it of documents.

4. The invention as claimed in claim 1, in which:
   register means are provided, responsive to signals from said sensors, to maintain a record of the location of each document; and
   means are provided, subject to demand of an operator, to provide signals identifying the locations of respective documents in the track.

5. The invention as claimed in claims 1, 2, 3 or 4 in which:
   the timer means is coupled to start counting on receipt of the first signal and to stop counting on receipt of the second signal.

6. The invention as claimed in claim 5, in which:
   the timer means is set to expire after a prescribed period to indicate when a jam condition has developed.

7. The invention as claimed in claim 1, 2, 3 or 4, in which:
   means are provided responsive to signals from a sensor among said plurality of sensors to assign a number to each document as it passes that sensor; and
   means are provided to keep track of the number of each document as it passes past successive sensors to enable the controller to maintain a record of the location of each document for use in control of the documents.

8. In a track controller for a document processor, means comprising:
   a plurality of sensors spaced along a document track to sense the presence of documents as they move along the track;
   means coupled to scan said sensors sequentially to detect whether documents are present at each sensor site;
   means comparing results of a current scan at a first site with the previous scan at that site to determine when the trailing edge of a document passes;
   first means functioning as a flip-flop coupled to be set in response to a signal denoting passage of the trailing edge;
   timing means coupled to start counting when the means functioning as a flip-flop is set;
   said means functioning as a flip-flop being coupled to be reset in response to a signal denoting passage of the trailing edge past a second site;
   said timing means stopping its count when the means functioning as a flip-flop is reset;

means identifying each sensor by number and providing a plurality of first words, each of which identifies the highest sensor number in a section of track;

means for identifying the address of timer means indicating jam conditions and providing a second word indicating said address;

means for comparing the second word successively with each of the first words until a match is made, thereby identifying a section of track in which the jam condition is located; and means for providing signals to stop the section of track in which the jam condition is located, clear the other sections of track and close the track down in an orderly fashion.

9. The invention as claimed in claim 8, in which:
said timing means is set to expire after a prescribed period to indicate when a jam condition has developed.

10. A method for controlling the track of a document processor, comprising:

placing a plurality of sensors along a document track to sense the presence of documents as they move along the track and detect when the trailing edges of the documents pass;

measuring the time lapse between the detection of the trailing edge of a document by successive sensors;

comparing said time lapse with a standard time period to determine when the time lapse is too long, thereby establishing that a jam condition exists;

providing signals to alert the system when a jam condition is determined to exist;

identifying each sensor by number and providing a plurality of first words, each of which identifies the highest sensor number in a section of track;

identifying the address of timer means indicating jam conditions and providing a second word indicating said address;

comparing the second word successively with each of the first words until a match is made, thereby identifying a section of track in which the jam condition is located; and providing signals to stop the section of track in which the jam condition is located, clear the other sections of track and close the track down in an orderly fashion.

11. The method according to claim 10, comprising:
detecting the passage of each document past a first sensor, and in response to the detection of each document, providing a distinct designation for each document, whereby each document may be identified individually as it passes through the track.

12. The method according to claim 10 or 11 in which:
the step of comparing signals from successive sensors involves a comparison using an exclusive OR technique by which a signal designating the passage of an edge is produced when one element and only one element of a pair of sensors senses energy from a source.

* * * * *